United States Patent [19]

Wesolowski

[11] Patent Number: 5,743,974

[45] Date of Patent: Apr. 28, 1998

[54] PNEUMATIC TIRE HAVING PITCH SEQUENCING

[75] Inventor: Piotr Janusz Wesolowski, Cuyahoga Falls, Ohio

[73] Assignee: The Goodyear Tire & Rubber Company, Akron, Ohio

[21] Appl. No.: 523,709

[22] Filed: Sep. 5, 1995

[51] Int. Cl.⁶ .................................................. B60C 113/00
[52] U.S. Cl. .................................................. 152/209 R
[58] Field of Search ........................... 152/209 R, 209 D

[56] References Cited

U.S. PATENT DOCUMENTS

| | | | |
|---|---|---|---|
| 1,956,011 | 4/1934 | Evans | 152/209 R |
| 4,327,792 | 5/1982 | Landers | 152/209 |
| 4,442,499 | 4/1984 | Sekula et al. | 364/574 |
| 4,474,223 | 10/1984 | Landers | 152/209 |
| 4,598,748 | 7/1986 | Campos et al. | 152/209 |
| 4,788,651 | 11/1988 | Parker et al. | 364/574 |
| 4,823,853 | 4/1989 | Hitzky | 152/209 R |
| 5,027,875 | 7/1991 | Kogure | 152/209 |
| 5,062,461 | 11/1991 | Noguchi | 152/209 R |
| 5,178,698 | 1/1993 | Shibata | 152/209 |
| 5,240,054 | 8/1993 | Kogure | 152/209 |
| 5,371,685 | 12/1994 | Bandel et al. | 364/505 |

FOREIGN PATENT DOCUMENTS

| | | | |
|---|---|---|---|
| 268436 | 5/1988 | European Pat. Off. | 152/209 R |
| 0114594 | 4/1989 | European Pat. Off. | |
| 0367557 | 10/1989 | European Pat. Off. | |
| 0370748 | 11/1989 | European Pat. Off. | |
| 0438108 | 1/1991 | European Pat. Off. | |
| 0454659 | 4/1991 | European Pat. Off. | |
| 0464438 | 6/1991 | European Pat. Off. | |
| 0528577 | 8/1992 | European Pat. Off. | |
| 0542493 | 11/1992 | European Pat. Off. | |
| 0618090 | 3/1994 | European Pat. Off. | |
| 0629519 | 5/1994 | European Pat. Off. | |
| 237804 | 9/1990 | Japan | 152/209 R |

Primary Examiner—Steven D. Maki
Attorney, Agent, or Firm—Bruce J. Hendricks

[57] ABSTRACT

The present invention relates to a pneumatic tire having a tread with a plurality of load-supporting elements placed above the circumference of the tire. The tread is characterized by a pitch sequence comprising (a) from 52 to 65 total pitches;

(b) only four different pitch lengths and the lowest indivisible integers used for the pitch ratios for the four pitch lengths are 11-13-15 and 17;

(c) a ratio of the longest pitch to the shortest pitch length not to exceed 1.55;

(d) a ratio of the longer pitch length to the shorter pitch length of any two pitches which precede or follow each other not to exceed 1.37;

(e) there being no instance in the pitch sequence where the shortest pitch length directly precedes or directly follows the longest pitch length;

(f) there being a constant increment in pitch length in the four different pitch lengths as one progresses from the shortest pitch length to the longest pitch length.

11 Claims, 4 Drawing Sheets

PNEUMATIC TIRE HAVING PITCH SEQUENCING

BACKGROUND OF THE INVENTION

The present invention relates to a pneumatic tire, more particularly to a tread pattern for pneumatic tire.

As a tire travels upon a surface, there occurs a movement of air, creating an audible sound. For any given tread pattern, a certain amount of acoustic energy is produced. While two different tread patterns may produce the same amount of acoustic energy, the noise produced by each may have dramatically different effects on people. One tire may sound harsh and disagreeable and the other quite acceptable. The difference between the two sounds is in their frequency spectrum and may result in a different subjective audible reaction. The condition where the sound generated is dominated by a single frequency and its harmonics, i.e., a majority of the sound generated being concentrated into very small frequency range of the sound spectrum is undesirable. This situation is psychologically upsetting to a listener, creating an uneasy feeling. Additionally, besides being irritating, total sounds can be perceived at greater distances and require more sound-proofing material than do non-total sounds. If a given concentration of sound energy could be spread out over a wider range of frequency, it would reduce the enology or the undesirability of the sound.

Various methods have been suggested in the past to reduce objectionable noise generated by tires by spreading the energy produced over the frequency range. For example, U.S. Pat. Nos. 4,327,792 and 4,474,223 disclose a method of spreading noise by load-supporting elements of a tire tread. This is accomplished by designing load-bearing elements in accordance with a five-step procedure to determine the maximum number of repeating design cycles which may be used, selecting the maximum pitch ratio, determining the appropriate number of harmonic segments into which the tread can be divided, determining the size of each harmonic segment and the number of design cycles for each harmonic segment and lastly arranging the various design cycles in each of the harmonic segments so that the wave length of the predominant modulation frequency of the segment corresponds to the formula length of that segment.

SUMMARY OF THE INVENTION

The present invention relates to a tire provided with a tread having a plurality of load-supporting elements placed above the circumference of the tire. The tread has a pitch sequence comprising:

(a) from 52 to 65 total pitches;

(b) only four different pitch lengths and the lowest indivisible integers used for the pitch ratios for the four pitch lengths are 11-13-15 and 17;

(c) a ratio of the longest pitch length to the shortest pitch length not to exceed 1.55;

(d) a ratio of the longer pitch length to the shorter pitch length of any two pitches which precede or follow each other not to exceed 1.37;

(e) there being no instance in the pitch sequence where the shortest pitch length directly precedes or directly follows the longest pitch length; and (f) there being a constant increment in pitch length in the four different pitch lengths as one progresses from the shortest pitch length to the longest pitch length.

DETAILED DESCRIPTION OF THE DRAWINGS

Figure 1:
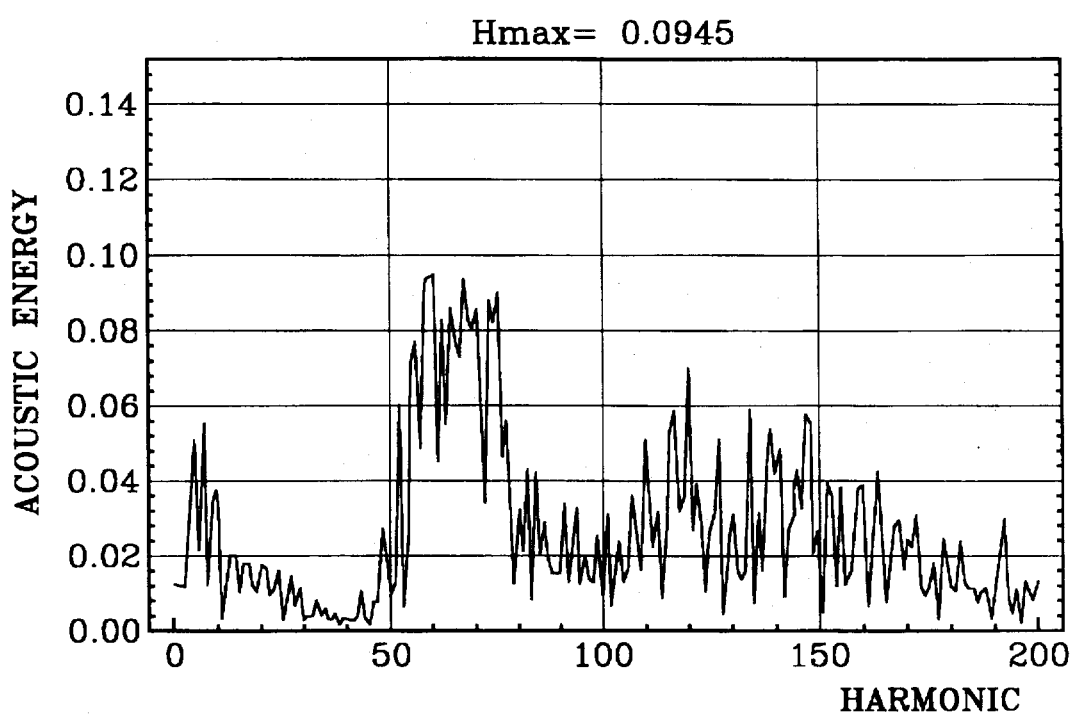

FIG. 1 is a graphical illustration of the Harmonic Analysis of the Impulse function for a tire tread having 64 pitches made in accordance with the present invention and having the pitch sequence disclosed herein.

Figure 2:
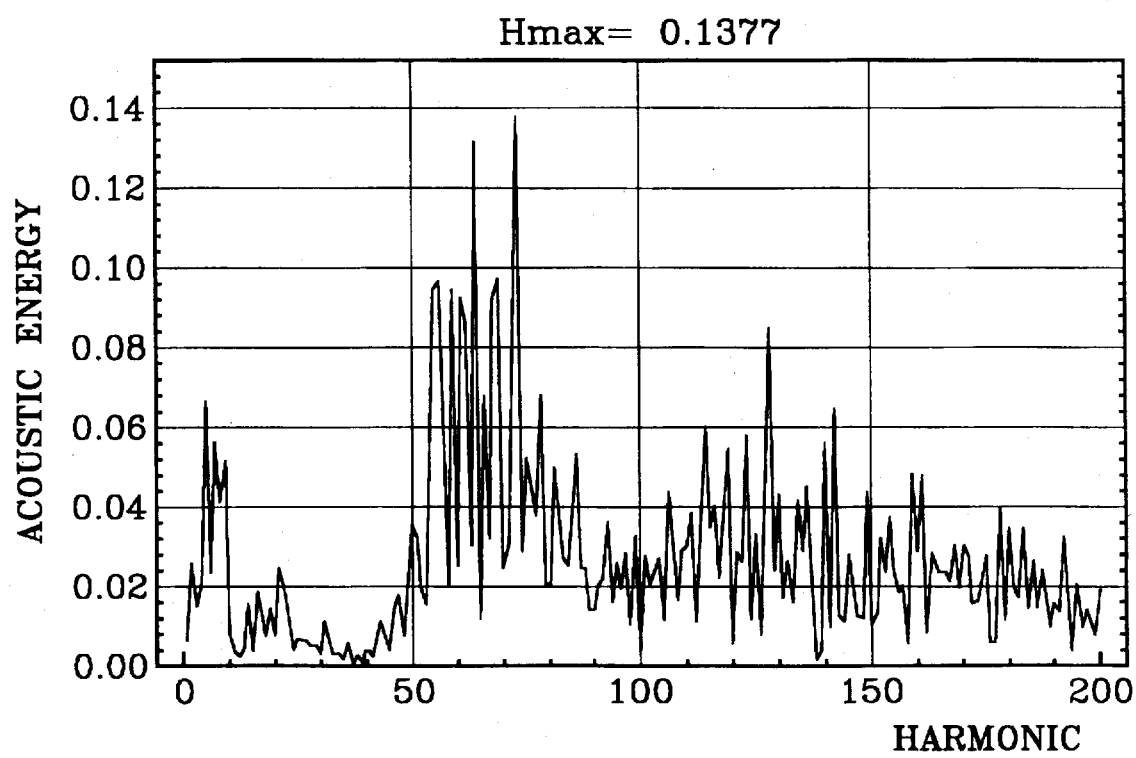

FIG. 2 is a graphical illustration of the Harmonic Analysis of the Impulse Function for a tire tread having 64 pitches and made in accordance with U.S. Pat. No. 4,474,223.

Figure 3:
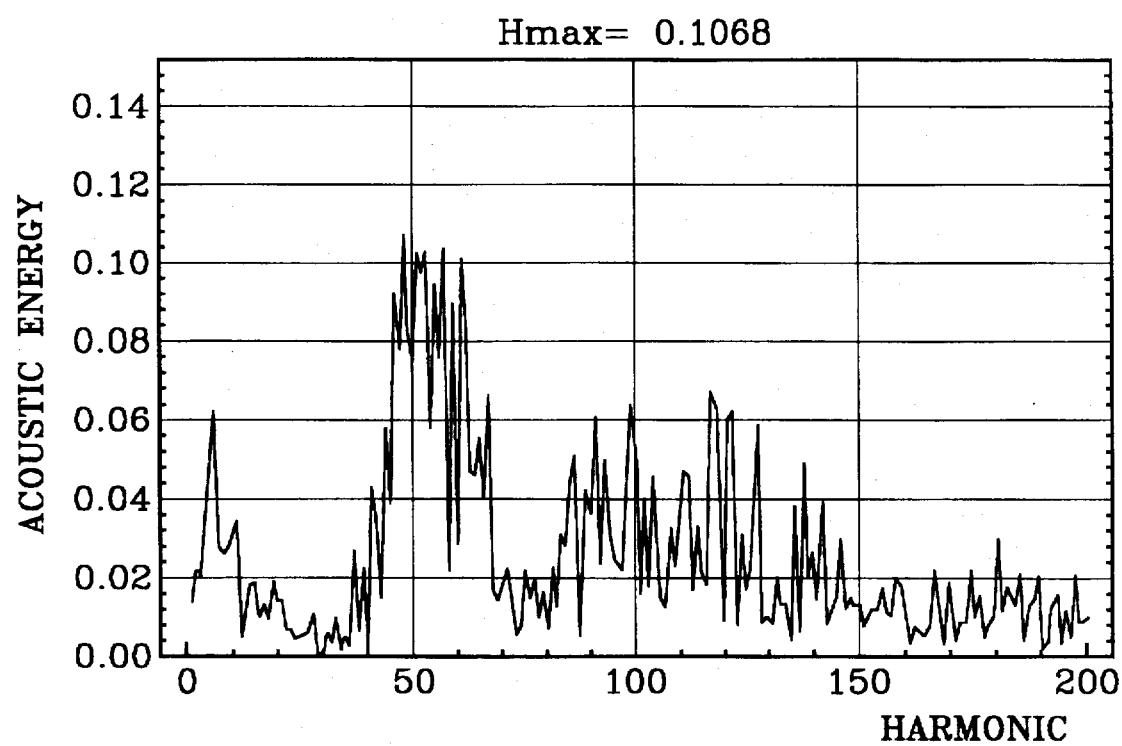

FIG. 3 is a graphical illustration of the Harmonic Analysis of the Impulse Function for a tire tread having 52 pitches made in accordance with the present invention and using the pitch sequence disclosed herein.

Figure 4:
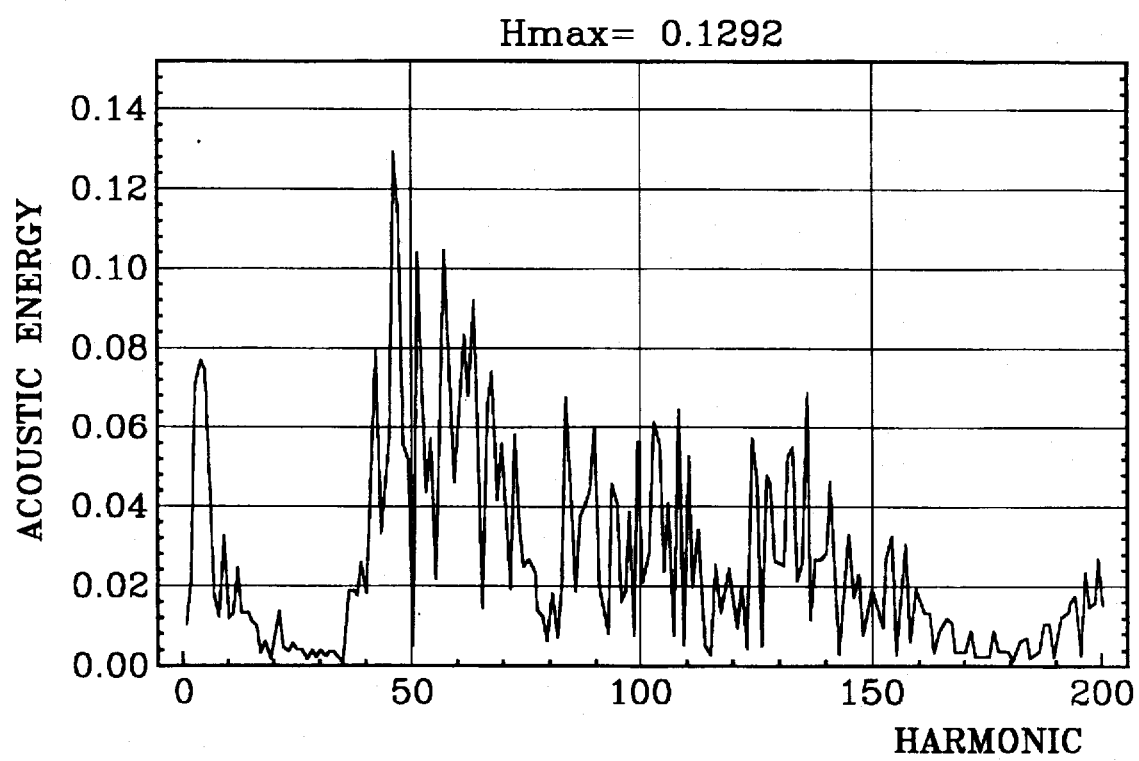

FIG. 4 is a graphical illustration of the Harmonic Analysis of the Impulse Function for a tire tread having 52 pitches and made in accordance with U.S. Pat. No. 4,474,223.

DETAILED DESCRIPTION OF THE INVENTION

As used herein and in the claims, the following terms are intended to mean:

"Pitch" also known as "design cycle" means a section of the tread in the circumferential direction which is repeated around the outer circumference of the tire. Normally, a pitch contains a load-bearing element and an adjacent groove which separates adjoining load-bearing elements in a tire tread. However, the boundaries of a pitch in the circumferential direction may bisect a load-bearing element or adjacent groove, depending on the point on the boundary in the axial direction. Even so, each pitch generally contains the total of at least one load-bearing element and at least one groove, but it may consist of two fractions which total one complete element or groove.

"Pitch ratio" means the ratio of the longest design cycle length to the shortest design cycle length.

"Pitch sequence" means the particular arrangement of different design cycle length segments around the full circumference of the tread.

"Pneumatic tire" means a laminated mechanical device of generally toroidal shape (usually an open torus) having beads, a carcass ply and a tread.

The pneumatic tires of the present invention have improved pitch sequencing. Use of these sequences in tires result in improved subjective noise properties and are believed to result in reducing uneven treadwear.

The ratio of the longest pitch length to the shortest pitch length should not exceed 1.55. Preferably, the ratio ranges from 1.5 to 1.55.

The ratio of the longer pitch length to the shorter pitch length of any two pitches which precede or follow each other should not exceed 1.37. Therefore, this pitch length ratio ranges from 1.0 to 1.37.

In the pitch sequences used in the present invention, the lowest indivisible integers used for pitch ratios for the four pitch lengths are 11, 13, 15 and 17. There is a constant increment in pitch length in the four different pitch lengths as one progresses from the shortest pitch length to the longest pitch length. For example, for the pitch length ratio 11, 13, 15 and 17, there is a constant increment of 2.

There are seven pitch sequences which are preferred embodiments of the present invention. In terms of this pitch ratios, the following sequences are disclosed. The sequences below are interpreted in terms of a closed loop (like a tire) and any pitch can initiate the sequence or terminate the sequence so long as the order of the sequence is maintained.

The first pitch sequence consists of 52 total pitches. The pitch sequence is as follows: 15 13 17 15 15 11 13 17 13 13 15 15 15 13 13 11 11 13 15 13 13 17 15 11 13 11 13 17 13 11 11 11 13 15 17 17 15 15 11 13 11 11 11 13 15 17 15 11 11 13 11 15.

The second preferred pitch sequence has a total of 55 pitches and is as follows: 13 13 15 15 13 11 11 11 11 13 13 15 17 15 11 15 11 13 13 13 15 11 13 17 15 15 13 13 17 13 11 11 13 13 17 15 11 13 11 13 11 13 15 15 17 13 17 13 11 13 11 11 11 13 17.

The third preferred pitch sequence consists of 57 total pitches and is as follows: 13 11 13 15 17 15 13 17 13 13 11 11 11 11 11 13 15 17 15 13 15 11 11 11 11 11 13 15 13 17 15 11 15 11 15 11 13 13 13 15 15 13 13 17 15 17 15 13 11 13 11 11 13 15 15 13 11.

The fourth preferred pitch sequence consists of 59 total pitches and is as follows: 15 15 17 15 13 13 11 15 11 15 13 13 11 11 11 15 17 15 11 11 13 15 13 11 11 11 11 15 15 13 17 13 13 11 11 11 13 17 15 13 11 11 15 17 15 13 11 13 13 17 17 15 15 11 13 11 11 13.

The fifth preferred pitch sequence consists of 62 total pitches and is as follows: 15 15 15 11 13 15 17 17 15 13 11 11 11 13 13 15 17 15 15 15 13 15 11 11 13 15 17 15 13 11 11 13 13 15 13 11 11 13 15 17 13 11 13 15 15 17 13 13 11 11 11 13 15 15 17 17 15 11 13 13 11.

The sixth preferred pitch sequence consists of 64 total pitches and is as follows: 15 17 13 17 15 13 11 11 11 13 13 15 15 17 15 15 13 11 11 15 15 13 17 13 15 13 13 11 11 15 11 11 13 15 17 13 13 11 13 13 15 17 13 11 11 11 13 13 17 17 15 15 13 15 11 13 13 11 11 13 15 15 15 11.

The seventh preferred pitch sequence consists of 65 total pitches and is as follows: 15 15 15 17 13 13 15 11 11 15 13 13 17 15 15 13 13 11 11 15 13 11 11 15 17 13 11 13 13 13 15 17 13 11 11 11 13 17 15 17 15 13 15 13 13 13 11 11 11 13 15 17 13 11 15 13 17 17 15 13 11 11 11 13.

The tires of the present invention may be for passenger vehicles, multi-purpose vehicles, light truck and medium truck.

According to the present invention, what determines the individual design cycles length on a given tire are the requirements of (a) there being only from 52 to 65 total pitches, (b) only four different pitch lengths, (c) the specific pitch sequence, (d) the four design cycle length ratios and (e) the known outer circumference of the tire. To determine how long each design cycle would be for a tire of a given outer circumference, one takes the sum of all the integers in the pitch sequence expressed in terms of ratios. For example, for the above 52 pitch sequence, the sum would be 702 (11× 15+13×16+15×14+17×7). For a tire of the size P195/65R15, the outer circumference would be 2001 mm. If one divides the outer circumference 2001 mm by 702, one gets 2.85. One takes this number 2.85 and multiplies it by 11, 13, 15 and 17 to yield the respective pitch lengths, 31.35 mm, 37.06 mm, 42.75 mm and 48.46 mm.

EXAMPLE 1

Computer simulation tests have been performed comparing the Harmonic Analysis of the Impulse function of tire treads with pitch sequences arranged according to the present invention versus pitch sequences according to U.S. Pat. No. 4,474,223.

FIG. 1 is a graphical illustration of the Harmonic Analysis of the Impulse function using the pitch sequence consisting of 64 individual pitches which are as follows: 15 17 13 17 15 13 11 11 11 13 13 15 15 17 15 15 13 11 11 15 15 13 17 13 15 13 13 11 11 15 11 11 13 15 17 13 13 11 13 13 15 17 13 11 11 11 13 13 17 17 15 15 13 15 11 13 13 11 11 13 15 15 15 11.

FIG. 2 is a graphical illustration of the Harmonic analysis of the Impulse function using a pitch sequence consisting of 64 individual pitches in accordance with U.S. Pat. No. 4,474,223 and which are as follows:

| 7  | 7  | 7  | 7  | 9 | 9  | 9  | 9  | 11 | 11 |
|----|----|----|----|---|----|----|----|----|----|
| 11 | 11 | 9  | 9  | 7 | 7  | 9  | 9  | 11 | 11 |
| 9  | 9  | 9  | 7  | 9 | 11 | 9  | 9  | 9  | 7  |
| 7  | 7  | 9  | 9  | 9 | 11 | 11 | 11 | 9  | 9  |
| 9  | 7  | 7  | 9  | 9 | 11 | 11 | 9  | 9  | 9  |
| 7  | 9  | 11 | 9  | 9 | 9  | 7  | 7  | 9  | 9  |
| 11 | 11 | 9  | 9. |   |    |    |    |    |    |

In comparing the FIGS. 1 and 2, it is seen that the Fourier spectrum of impulse function for the tire tread where the pitch sequence is arranged according to the current invention (FIG. 1) has flatter harmonics components than the pitch sequence in FIG. 2. The flatter harmonics components translate to reduced tire noise as the tire contacts the road surface. The quality of the calculated Fourier spectrum can be also expressed by a maximum Normalized Amplitude. It is clearly visible from comparison of FIGS. 1 versus 2 that the maximum Normalized Amplitude calculated from pitch sequence(s) arranged according to the present invention are lower that those arranged in accordance to the U.S. Pat. No. 4,474,223. Accordingly, it has been determined that a tire having pitches arranged according to the current invention has a reduction in tread noise as the tire contacts the road surface. In particular, there is a reduction of the maximum amplitude in 200 harmonic spectrum by more than 30 percent.

EXAMPLE 2

Computer simulation tests have been performed comparing the Harmonic Analysis of the Impulse function of tire treads with pitch sequences arranged according to the present invention versus pitch sequences according to U.S. Pat. No. 4,474,223.

FIG. 3 is a graphical illustration of the Harmonic Analysis of the Impulse function using the pitch sequence consisting of 52 individual pitches which are as follows: 15 13 17 15 15 11 13 17 13 13 15 15 15 13 13 11 11 13 15 13 13 17 15 11 13 11 13 17 13 11 11 11 13 15 17 17 15 15 11 13 11 11 11 13 15 17 15 11 11 13 11 15.

FIG. 4 is a graphical illustration of the Harmonic analysis of the Impulse function using a pitch sequence consisting of 52 individual pitches in accordance with U.S. Pat. No. 4,474,223 and which are as follows:

| 7  | 7  | 7  | 7  | 7  | 9 | 9  | 9  | 9  | 9  |
|----|----|----|----|----|---|----|----|----|----|
| 11 | 11 | 11 | 11 | 11 | 9 | 9  | 9  | 7  | 7  |
| 7  | 7  | 9  | 9  | 9  | 9 | 11 | 11 | 11 | 11 |
| 9  | 7  | 7  | 7  | 9  | 9 | 9  | 11 | 11 | 11 |
| 9  | 7  | 7  | 7  | 9  | 9 | 9  | 11 | 11 | 11 |
| 9  | 9. |    |    |    |   |    |    |    |    |

What is claimed is:

1. A tire provided with a tread having a plurality of load-supporting elements placed about the circumference of said tire, said tread having a pitch sequence comprising:

(a) 52, 55, 57, 59, 62, 64 or 65 total pitches;

(b) only four different pitch lengths and the lowest indivisible integers used for the pitch ratios for the four pitch lengths are 11-13-15 and 17;

(c) a ratio of the longest pitch length to the shortest pitch length not to exceed 1.55;

(d) a ratio of the longer pitch length to the shorter pitch length of any two pitch which precede or follow each other not to exceed 1.37;

(e) there being no instance in the pitch sequence where the shortest pitch length directly precedes or directly follows the longest pitch length; and (f) there being a constant increment in pitch length in the four different pitch lengths as one progresses from the shortest pitch length to the longest pitch length;

wherein said 52 total pitches consist of 15 13 17 15 15 11 13 17 13 13 15 15 15 13 13 11 11 13 15 13 13 17 15 11 13 11 13 17 13 11 11 11 13 15 17 17 15 15 11 13 11 11 11 13 15 17 15 11 11 13 11 15;

wherein said 55 total pitches consist of 13 13 15 15 13 11 11 11 11 13 13 15 17 15 11 15 11 13 13 13 15 11 13 17 15 15 13 13 17 13 11 11 13 13 17 15 11 13 11 13 11 13 15 15 17 13 17 13 11 13 11 11 11 13 17;

wherein said 57 total pitches consist of 13 11 13 15 17 15 13 17 13 13 11 11 11 11 11 13 15 17 15 13 15 11 11 11 11 11 13 15 13 17 15 11 15 11 15 11 13 13 15 15 13 13 17 15 17 15 13 11 13 11 11 13 15 15 13 11;

wherein said 59 total pitches consist of 15 15 17 15 13 13 11 15 11 15 13 13 11 11 11 15 17 15 11 11 13 15 13 11 11 11 11 15 15 13 17 13 13 11 11 11 13 17 15 13 11 11 15 17 15 13 11 13 13 17 17 15 15 11 13 11 11 13;

wherein said 62 total pitches consist of 15 15 15 11 13 15 17 17 15 13 11 11 11 13 13 15 17 15 15 15 13 15 11 11 13 15 17 15 13 11 11 13 13 15 13 11 11 13 15 17 13 11 13 15 15 17 13 11 13 15 15 17 13 13 11 11 11 11 13 15 15 17 17 15 11 13 13 11;

wherein said 64 total pitches consist of 15 17 13 17 15 13 11 11 11 13 13 15 15 17 15 15 13 11 11 15 15 13 17 13 15 13 13 11 11 15 11 11 13 15 17 13 13 11 13 13 15 17 13 11 11 11 13 13 17 17 15 15 13 15 11 13 13 11 11 13 15 15 15 11; and wherein said 65 total pitches consist of 15 15 15 17 13 13 15 11 11 15 13 13 17 15 15 13 13 11 11 15 13 11 11 15 17 13 11 15 17 13 11 13 13 15 17 13 11 11 11 11 13 17 15 17 15 13 15 13 13 13 11 11 11 13 15 17 13 11 15 13 17 17 15 13 11 11 11 13.

2. The tire of claim 1 wherein the pitch sequence consists of 52 total pitches and consisting of 15 13 17 15 15 11 13 17 13 13 15 15 15 13 13 11 11 13 15 13 13 17 15 11 13 11 13 17 13 11 11 11 13 15 17 17 15 15 11 13 11 11 11 13 15 17 15 11 11 13 11 15.

3. The tire of claim 1 wherein the pitch sequence consists of 55 total pitches and consisting of 13 13 15 15 13 11 11 11 11 13 13 15 17 15 11 15 11 13 13 13 15 11 13 17 15 15 13 13 17 13 11 11 13 13 17 15 11 13 11 13 11 13 15 15 17 13 17 13 11 13 11 11 11 13 17.

4. The tire of claim 1 wherein the pitch sequence consists of 57 total pitches and consisting of 13 11 13 15 17 15 13 17 13 13 11 11 11 11 11 13 15 17 15 13 15 11 11 11 11 11 13 15 13 17 15 11 15 11 15 11 13 13 13 15 13 17 15 11 15 11 15 11 13 13 13 15 15 13 13 17 15 17 15 13 11 13 11 11 13 15 15 13 11.

5. The tire of claim 1 wherein the pitch sequence consists of 59 total pitches and consisting of 15 15 17 15 13 13 11 15 11 15 13 13 11 11 11 15 17 15 11 11 13 15 13 11 11 11 11 15 15 13 17 13 13 11 11 11 13 17 15 13 11 11 15 17 15 13 11 11 13 17 17 15 15 11 13 11 13 11 11 13.

6. The tire of claim 1 wherein the pitch sequence consists of 62 total pitches and consisting of 15 15 15 11 13 15 17 17 15 13 11 11 11 13 13 15 17 15 15 15 13 15 11 11 13 15 17 15 13 11 11 13 13 15 13 11 11 13 15 17 13 11 13 15 15 17 13 13 11 11 11 11 13 15 15 17 17 15 11 13 13 11.

7. The tire of claim 1 wherein the pitch sequence consists of 64 total pitches and consisting of 15 17 13 17 15 13 11 11 11 13 13 15 15 17 15 15 13 11 11 15 15 13 17 13 15 13 13 11 11 15 11 11 13 15 17 13 13 11 13 13 15 17 13 11 11 11 13 13 17 17 15 15 13 15 11 13 13 11 11 13 15 15 15 11.

8. The tire of claim 1 wherein the pitch sequence consists of 65 total pitches and consisting of 15 15 15 17 13 13 15 11 11 15 13 13 17 15 15 13 13 11 11 15 13 11 11 15 17 13 11 13 13 15 17 13 11 11 11 11 13 17 15 17 15 13 15 13 13 13 11 11 11 13 15 17 13 11 15 13 17 17 15 13 11 11 11 13.

9. The tire of claim 1 wherein said tire is a passenger tire.

10. The tire of claim 1 wherein said tire is a light truck tire.

11. The tire of claim 1 wherein said tire is a medium truck tire.

* * * * *